March 18, 1969     C. H. RIBLEY     3,433,277
FOLDABLE SAWBUCK
Filed Oct. 20, 1966
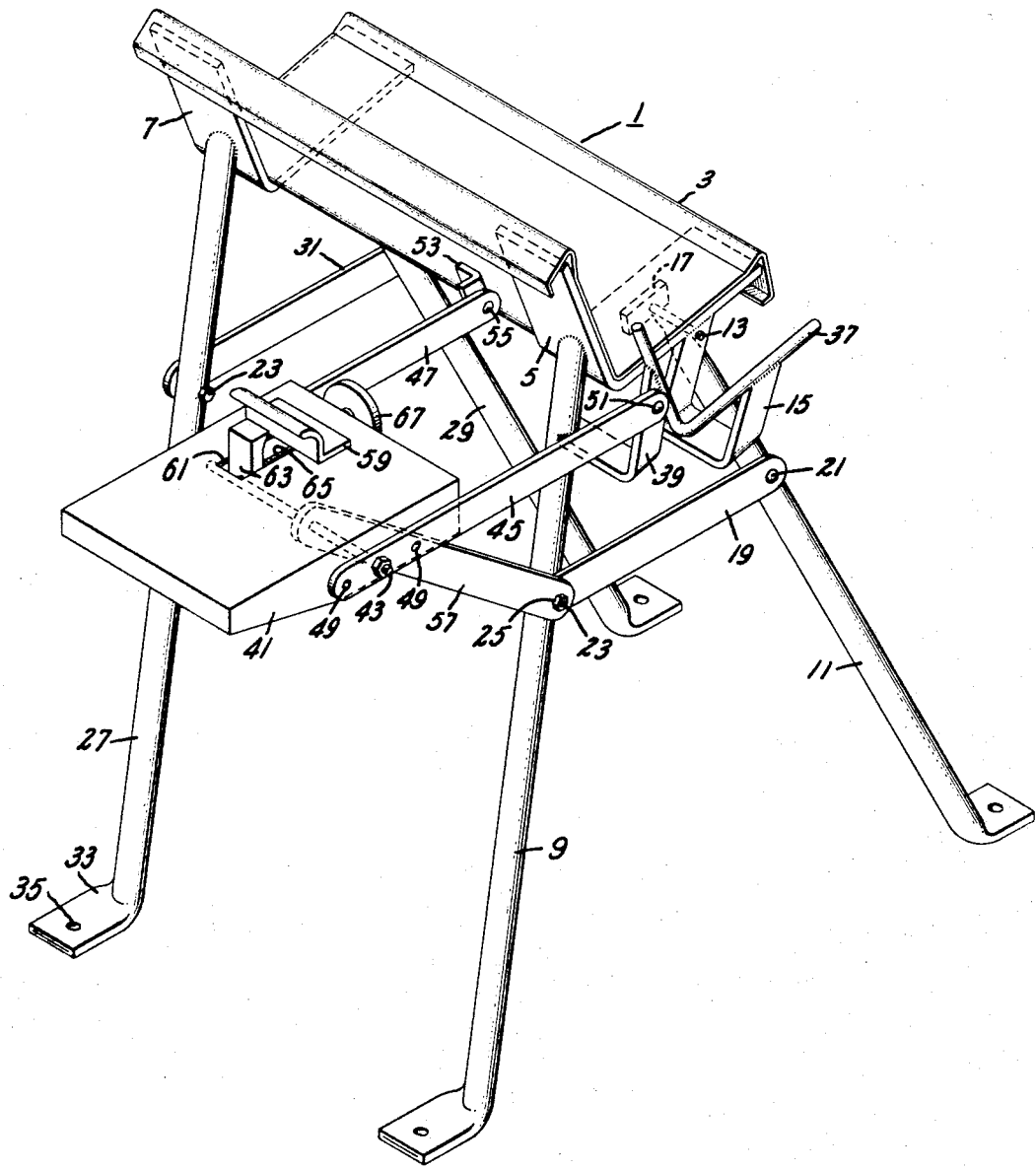
Inventor:
Charles H. Ribley,
by Carl O. Thomas
His Attorney.

3,433,277
FOLDABLE SAWBUCK
Charles H. Ribley, 3702 State St.,
Niskayuna, N.Y. 12304
Filed Oct. 20, 1966, Ser. No. 588,207
U.S. Cl. 143—91  10 Claims
Int. Cl. B27b 21/02

ABSTRACT OF THE DISCLOSURE

The device relates to a foldable sawbuck for supporting a workpiece and a portable chain saw. It comprises a work platform and a swingable chain saw platform attached thereto; the attachment being such that the chain saw can be moved into and out of operating relationship with the work.

---

In recent years small, hand-held engine-powered chain saws have largely displaced axes and hand saws as means for felling trees and sub-dividing timbers in locations where electricity is not readily available. Portable chain saws are now almost exclusively used for sawing tree trunks and limbs to length for easy transport or for use as fire wood. The popularity of these saws is attributable to the high speed and comparative ease with which timber can be sub-divided.

These saws are not without attendant disadvantages, however. Because of their high rate of cutting, they are, unless handled with considerable care, hazardous to use. The saws frequently buck or kick up when cutting requiring a firm grip to maintain control. This undesirable behavior of the saws can be minimized by maintaining the saw teeth sharp. While this might seem a simple precaution worthy of the time required, it must be borne in mind that in an operation such as felling a tree and cutting it into kindling, for example, probably only the first cut will fail to bring the saw into contact with the earth. After the tree has been felled, in all probability the saw teeth will dig into the ground to some extent at the termination of each cut even with the exercise of reasonable care. The abrasive grit from the soil will soon dull the teeth of any saw. While it is desirable for safety reasons to maintain the saw teeth well sharpened, it is not as a practical matter always attainable. Accordingly, while it is simple enough to demonstrate the correct usage of portable chain saws, maintaining a desirably high level of protection to the fatigued or momentarily inattentive workman is another matter.

It is an object of my invention to provide a stable, compact, easily transported support for use in sub-dividing timbers with a portable chain saw of the hand-held type.

It is a more specific object to provide a sawbuck which can be readily assembled and disassembled.

It is still another object to provide a sawbuck formed to minimize any tendency of a portable chain saw to buck or to bind.

These and other objects of my invention are accomplished by providing a sawbuck comprised of a workpiece bed having first and second ends. Means are provided for mounting the bed including first and second legs, means fixedly connecting the first leg to the bed proximate the first end, means for attaching the second leg to the bed for movement relative to the first leg, and means for normally preventing and for selectively permitting movement of the first leg relative to the second leg. A bed extension is provided as well as means mounting the bed extension beyond the first end of the bed by at least the width of a chain saw kerf. A chain saw pallet is provided together with means for mounting the pallet for pivotal movement with respect to the bed and with respect to an axis laterally displaced from the bed. Means are incorporated for normally restraining movement of the pallet with respect to the bed while allowing limiting pivotal movement of the pallet with respect to the axis laterally displaced from the bed.

My invention may be better understood by reference to the following detailed description considered in combination with the drawing, which is a perspective view of my foldable sawbuck.

The foldable sawbuck 1 is comprised of a workpiece bed 3 shaped of sheet metal or any other convenient construction material to form a trough for holding a log, timber, or other workpiece. Reinforcing straps 5 and 7, which are optional, are secured to opposite ends of the bed as by welding, rivets, bolts, etc. The straps form a portion of the bed. If desired, the bed could be alternately formed of heavier gauge material so that the straps are not required. According to another alternative, the sheet metal forming the bed may be folded over at either end of the bed prior to shaping the bed to form a trough. The folded over ends would then perform similarly as the straps.

First and second legs 9 and 11, respectively, are connected to the strap 5. The first leg 9 is shown rigidly secured to the strap as by welding. The second leg 11 is integrally connected to a pin 13. The pin 13 is then passed through an aperture in a U-shaped strap 15. Subsequently an apertured lug 17 is mounted over the opposite end of the pin, and the lug is then connected to the strap 5 by welding, or any other conventional connecting means. To normally prevent pivotal movement of the second leg with respect to the bed and the first leg, a brace 19 is provided extending between the two legs. A pin 21 extends through one end of the brace and through the second leg to pivotally attach the brace to the second leg. A removable bolt 23 extends through the first leg and the opposite end of the brace. A nut 25 is secured to the bolt. This provides a readily removable interconnection between the brace and the first leg.

The strap 7 is similarly provided with third and fourth legs 27 and 29, respectively, connected thereto. The third leg 27 is connected to the strap 7 similarly as the first leg is connected to strap 5. The fourth leg 29 is connected to the strap 7 similarly as the second leg is connected to the strap 5, except that two lugs similar to lug 17 are utilized rather than a lug and a U-shaped strap. A second brace 31 identical to brace 19 extends between the third and fourth legs and is connected thereto by a pin similar to pin 21 and a removable bolt 23 and nut 25.

The legs are shown formed of a tubular stock, although this is not necessary. To aid in stabilizing the bed, the lower end of the legs are crimped to form horizontal feet 33. An aperture 35 is provided in each foot to allow the user to further brace the sawbuck by attaching horizontal strips, such as one inch boards, for example, between adjacent legs. In rough terrain such horizontal bracing may prove undesirable. It is appreciated that additional bracing is in any event optional.

A workpiece bed extension 37 is mounted spaced from the end of the bed. The bed extension is shown formed of a rod bent to conform to the contour of the upper surface of the bed. The U-shaped strap mounts the extension spaced from the end of the bed and at a level slightly below the level of the bed, although the extension could be mounted at the same level. An L-shaped strap is welded to the extension and to the first leg to provide additional bracing. Either of straps 15 or 39 could be used separately, although the use of both is preferred for greater rigidity of the extension. The spacing of the extension from the end of the bed must be at least the width of a chain saw kerf. In practice it is preferred to leave a spacing considerably larger than the saw kerf, so that accurate alignment of the chain saw with respect to the end of the table is not required.

A chain saw mounting pallet 41 is provided laterally displaced from the bed. The pallet is free to pivot about a tie bolt 43 extending through apertures in opposed in opposed edges of the pallet. Identical mounting arms 45 and 47 are provided with a plurality of apertures 49 adjacent one end. The apertures are located at various distances from the end of the arms to allow for adjustment of the distance between the pallet and the bed. As illustrated the tie bolt passes through the middle of three apertures 49 provided in each mounting arm. The mounting arm 45 is connected to the strap 39 for pivotal movement by a pin 51. The mounting arm 47 is connected to the bed for pivotal movement with respect thereto by a bent lug 53 welded to the bottom surface of the bed and by a pin 55 extending through the mounting arm and the lug.

A prop 57 is provided to hold the pallet up in the desired position for use. One end of the prop is provided with a aperture through which bolt 23 of the first leg extends. The opposite end of the prop is provided with an aperture through which tie bolt 43 extends.

For purposes of illustrating a suitable clamp for connecting a chain saw to the pallet, a fixed jaw 59 is shown attached to the pallet as by welding, rivets, bolts, etc. A window 61 is provided in the pallet through which a moveable jaw 63 extends. A threaded bolt 65 passes through the front edge of the pallet through an unthreaded aperture and is threadedly attached to the movable jaw. The end of the threaded bolt is provided with a turn knob 67. Preferably the end of the threaded bolt lying beneath the pallet is further supported. This may be easily accomplished by turning down at right angles a portion of the pallet surface when the window 61 is being formed. In this instance a depending wall will be formed along the rear edge of the window. By drilling a hole in the depending wall the inner end of the threaded bolt can be supported. The particular clamp arrangement shown is for use with a portable chain saw having a lower handle that can be readily grasped between the jaws. Various chain saw designs may require differing clamping means associated with the pallet to insure that the chain saw is securely fastened to the pallet in the desired position.

It is anticipated that the sawbuck will be shipped and stored in a folded configuration. In this configuration the bolts 23 are removed from the first and third legs. This allows braces 19 and 31 to pivot about the second and fourth legs, thereby also allowing the second and fourth legs to pivot with respect to the bed about pins 13. Accordingly, the second and fourth legs fold inwardly into contact with the first and third legs, respectively. At the same time, with the bolt 23 removed, the prop 57 rotates about tie bolt 43 allowing the pallet and mounting arms to rotate about pins 51 and 55 so that the pallet lies alongside the first leg. It is thus apparent that in the folded configuration the sawbuck is no wider than the bed itself. Placing the sawbuck in the operative configuration merely requires the insertion of bolts 23 to achieve the configuration shown in the drawing.

When the sawbuck is in the operative configuration with the pallet and legs extended, a portable chain saw is oriented with respect to the pallet so that when the pallet is rotated about tie bolt 43, the guide arm of the saw over which the cutting chain runs moves vertically up and down and intersects the axis formed by the trough in the bed at substantially right angles thereto. The saw teeth and guide arm must pass between the end of the bed and the bed extension. Also, it is preferred that the saw be so oriented on the pallet that the saw teeth running over the lower edge of the guide arm be capable of extending below the bottom of the bed trough when the pallet is rocked forward to contact the front edge of the pallet with the prop. The saw teeth should, however, still be above the lower portion of the straps 15 and 39.

In the specific embodiment illustrated the chain saw is clamped to the pallet merely by placing a lower handle of the chain saw between the jaws and turning the knob to draw the moveable jaw closer to the fixed jaw until the desired degree of clamping pressure is obtained to hold the saw in the desired position. A timber to be subdivided is then laid in the trough of the bed. The pallet is rocked backward so that the knob edge of the pallet rises higher above the prop. This also rotates the cutting arm of the chain saw well above the upper surface of the bed. The timber is then slid in the trough so that at least a portion thereof overlies the bed extension. The saw is then rocked forward with the motor running and the saw chain rotating, and the timber is sawed in two.

Absent the bed extension there would be some tendency for the end of the bed to act as a pivot axis for the timber to be sub-divided. The tendency for the timber to rotate with respect to the bed increases, of course, as the distance between the saw kerf and the end of the table increases, since this increases the leverage of the downward force exerted by the saw. The bed extension provides an upward reactive force off-setting any tendency of the workpiece to rotate. This then relieves the mounting arms and pallet of any twisting stress and minimizes any possibility of the chain saw being wrenched from the pallet with possible injury consequent. At the same time the bed extension is positioned just slightly below the level of the bed. This minimizes any tendency for the kerf to close during cutting through a workpiece, thereby binding the saw chain or guide arm. The operator, of course, need make no effort to stop the saw at the termination of a cut. Assuming proper positioning of the saw with respect to the pallet in the first instance, the front edge of the pallet will abut the prop and prevent further downward movement of the saw chain at a level above the lower portions of the straps 15 and 39.

While my invention has been disclosed with respect to a specific embodiment, it is appreciated that numerous variations will readily occur to those skilled in the art. It is accordingly intended that the scope of my invention be determined with reference to the following claims.

What I claim and desire to secure by Letters Patent of the United States is

1. A sawbuck comprising
    a workpiece bed having first and second ends, means mounting said bed including
        first and second legs,
        means fixedly connecting said first leg to said bed proximate said first end,
    means for attaching said second leg to said bed for movement relative to said first leg, and
    means for normally preventing and for selectively permitting movement of said first leg relative to said second leg,
    a bed extension,
    means mounting said bed extension beyond said first end of said bed by at least the width of a chain saw kerf,
    a chain saw pallet,
    means mounting said pallet for pivotal movement with respect to said bed and with respect to an axis laterally displaced from said bed, and
    means for normally restraining movement of said pallet with respect to said bed while allowing limited pivotal movement of said pallet with respect to said axis laterally displaced from said bed.

2. A sawbuck according to claim 1 in which said bed mounting means additionally includes
    third and fourth legs,
    means fixedly connecting said third leg to said bed proximate said second end,
    means for attaching said fourth leg to said bed for movement relative to said third leg, and means for normally preventing and for selectively permitting movement of said first leg relative to said second leg.

3. A sawbuck according to claim 1 in which said means for attaching said second leg to said bed for movement relative to said first leg is a pivotal connection, and in which said means for normally preventing and for selectively permitting movement of said first leg relative to said second leg is comprised of a brace, a pin connecting said brace to said first leg, and a pin connecting said brace to said second leg, at least one of said pins be selectively removable.

4. A sawbuck according to claim 1 in which said means mounting said pallet for pivotal movement with respect to said bed and with respect to an axis laterally displaced from said bed is comprised of a mounting arm, means providing a pivotal interconnection of one end of said arm to said bed, and means providing a pivotal interconnection of one end of said arm to said pallet.

5. A sawbuck according to claim 1 in which said means for normally restraining movement of said pallet with respect to said bed while allowing limited pivotal movement of said pallet with respect to said axis laterally displaced from said bed is comprised of a prop, means pivotally connecting one end of said prop to said first leg and means pivotally connecting one end of said prop to said pallet.

6. A sawbuck according to claim 1 including means on said pallet for attaching a chain saw.

7. A sawbuck according to claim 1 in which said bed extension lies at a slightly lower level than said bed.

8. A sawbuck according to claim 1 in which said bed defines a trough and in which said bed extension is a bar shaped to the contour of said trough.

9. A sawbuck according to claim 1 in which said means mounting said bed includes third and fourth legs, a first brace, means pivotally connecting one end of said first brace to said second leg, and a removable pin connecting remaining end of said first brace to said fourth leg, at least one of said pivotally connecting means being a removable pin.

10. A sawbuck according to claim 1 in which said means for normally preventing and for selectively permitting movement of said first leg relative to said second leg includes a brace, means pivotally connecting said brace to said second leg, and a removable pin connecting said brace to said first leg, and said means for normally restraining movement of said pallet with respect to said bed comprising a prop, means pivotally connecting one end of said prop to said pallet, and a remaining end of said prop being secured to said first leg by said removable pin.

References Cited

UNITED STATES PATENTS 3,053,290  9/1962  Fitzgerald.

FOREIGN PATENTS 734,349  7/1955  Great Britain.
1,384,843  11/1964  France.

ANDREW R. JUHASZ, Primary Examiner.

FRANK T. YOST, Assistant Examiner.

U.S. Cl. X.R.

143—32